US009565971B2

(12) United States Patent
Fung et al.

(10) Patent No.: US 9,565,971 B2
(45) Date of Patent: Feb. 14, 2017

(54) FOOD MOUNTING ASSEMBLY FOR A COOKING APPLIANCE

(71) Applicants: Kam Fai Fung, Hong Kong (CN); Kin Man Lai, Hong Kong (CN)

(72) Inventors: Kam Fai Fung, Hong Kong (CN); Kin Man Lai, Hong Kong (CN)

(73) Assignee: CONAIR CORPORATION, Stamford, CT (US)

( * ) Notice: Subject to any disclaimer, the term of this patent is extended or adjusted under 35 U.S.C. 154(b) by 397 days.

(21) Appl. No.: 13/958,673

(22) Filed: Aug. 5, 2013

(65) Prior Publication Data

US 2015/0033955 A1  Feb. 5, 2015

(51) Int. Cl.
  *A47J 37/06* (2006.01)
  *A47J 43/18* (2006.01)
  *A47J 37/04* (2006.01)

(52) U.S. Cl.
  CPC ........... *A47J 37/0611* (2013.01); *A47J 37/041* (2013.01); *A47J 43/18* (2013.01); *A47J 2037/0617* (2013.01); *Y10T 29/49826* (2015.01)

(58) Field of Classification Search
  CPC ..................... A47J 37/0611; A47J 2037/0617; A47J 37/041; A47J 43/18
  USPC ............... 99/372, 375, 376, 379, 421 H, 419
  See application file for complete search history.

(56) References Cited

U.S. PATENT DOCUMENTS

| 2,033,060 | A |   | 3/1936  | Anderson        |
|-----------|---|---|---------|-----------------|
| 2,057,501 | A |   | 10/1936 | Parr            |
| 2,607,287 | A |   | 8/1952  | Price           |
| 2,719,903 | A |   | 10/1955 | Oertli          |
| 3,799,047 | A | * | 3/1974  | Freeman ........................ 99/332 |
| 4,036,995 | A |   | 7/1977  | Koether et al.  |
| 4,088,067 | A |   | 5/1978  | Kaebitzsch et al. |
| 4,206,345 | A |   | 6/1980  | Maass et al.    |
| 4,697,504 | A |   | 10/1987 | Keating         |
| 5,237,914 | A |   | 8/1993  | Carstensen      |
| 5,467,696 | A |   | 11/1995 | Everhart        |
| 5,531,155 | A |   | 7/1996  | Pellicane et al. |
| 5,712,466 | A |   | 1/1998  | Spicer          |
| 5,758,568 | A |   | 6/1998  | Moravec         |
| 5,848,567 | A |   | 12/1998 | Chiang          |
| 5,992,302 | A |   | 11/1999 | Geisler         |
| 6,062,130 | A |   | 5/2000  | Brady           |
| D436,498  | S |   | 1/2001  | Carlson et al.  |

(Continued)

FOREIGN PATENT DOCUMENTS

EP  1479330  * 11/2004 .......... A47J 37/0611

OTHER PUBLICATIONS

WO 2008/018808 (Nordone) Feb. 2008, A47J 37/0611.*
WO 2008/043127 (Robinson et al) Apr. 2008, A47J 37/0611.*

*Primary Examiner* — Reginald L Alexander
(74) *Attorney, Agent, or Firm* — Grogan, Tuccillo & Vanderleeden, LLP

(57) ABSTRACT

A cooking appliance includes a lower housing having a lower heating element, an upper housing having an upper heating element, opposed frame members disposed between the upper housing and the lower housing and operatively connecting the lower housing to the upper housing. The cooking appliance further includes a food mounting assembly. The food mounting assembly includes a bracket extending between the opposed frame members for retaining a means for supporting food items over the lower heating element.

19 Claims, 5 Drawing Sheets

(56) References Cited

U.S. PATENT DOCUMENTS

| | | |
|---|---|---|
| 6,389,959 B1 | 5/2002 | Robertson |
| 6,439,108 B1 | 8/2002 | Wu |
| RE37,988 E | 2/2003 | Uss |
| 6,539,842 B1 | 4/2003 | Chapman et al. |
| 6,591,740 B1 | 7/2003 | Hsu |
| 6,595,116 B1 | 7/2003 | Lin |
| 6,705,306 B1 | 3/2004 | Dickey |
| 7,514,655 B2 | 4/2009 | Fernandez et al. |
| 7,608,803 B2 | 10/2009 | Jerovsek |
| 7,717,028 B2 | 5/2010 | Serra |
| 8,122,816 B2 | 2/2012 | Yu |
| 8,261,657 B2 | 9/2012 | Serra et al. |
| 2004/0074398 A1 | 4/2004 | Griffin et al. |
| 2004/0217109 A1* | 11/2004 | Chang .......................... 219/525 |
| 2005/0139086 A1 | 6/2005 | McHutchison |
| 2007/0119442 A1* | 5/2007 | Ho ................................ 126/9 R |
| 2008/0115676 A1* | 5/2008 | Tsen ................................ 99/391 |
| 2009/0165774 A1 | 7/2009 | Johnston et al. |
| 2012/0137897 A1 | 6/2012 | Tahincioglu |

\* cited by examiner

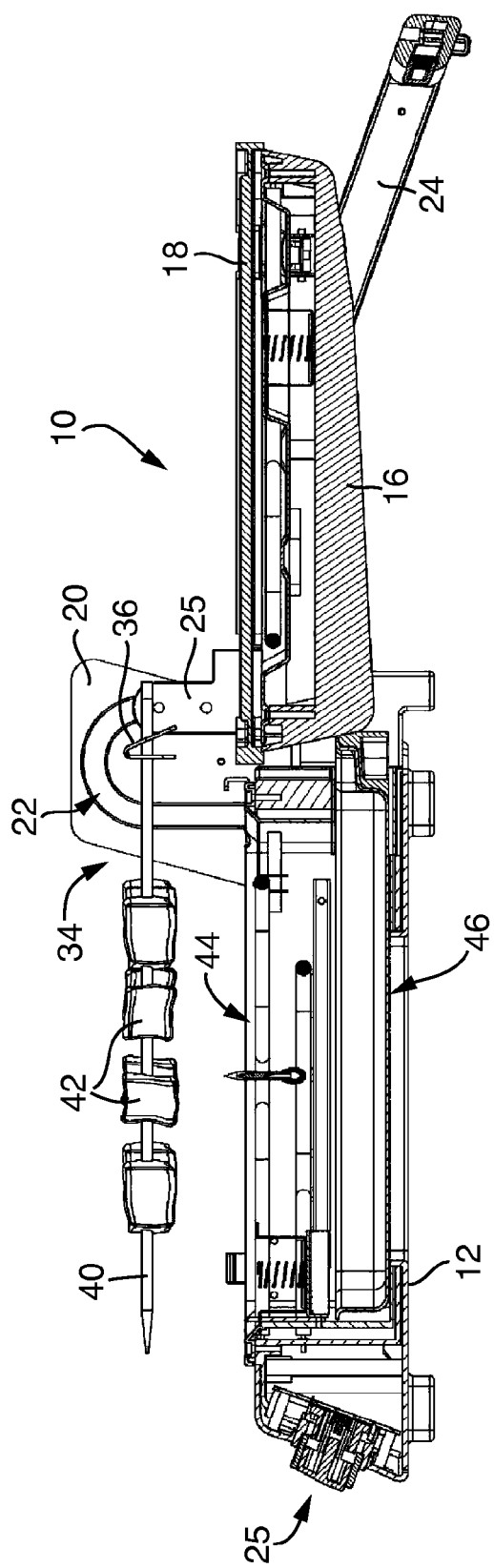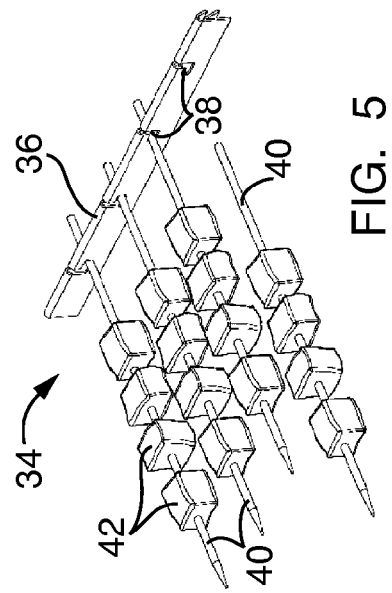

FOOD MOUNTING ASSEMBLY FOR A COOKING APPLIANCE

FIELD OF THE INVENTION

The present invention relates to cooking appliances and, more particularly, to a food mounting assembly for a cooking appliance.

BACKGROUND OF THE INVENTION

Cooking appliances, and in particular electric cooking/grilling devices such as griddles, are known. One type of known grilling devices typically evidences a lower housing having a lower cooking surface and an upper housing having an upper cooking surface, wherein the cooking surfaces are typically heated by an electrical resistance heater. A handle attached to the upper housing allows a user to raise and lower the upper housing relative to the lower housing to accommodate a food item therebetween to be heated.

While existing grilling devices are generally suitable for what is regarded as ordinary performance, there is room for improvement in terms of expanded functionality. In particular, existing devices are typically limited to a one or two types of cooking that can be accomplished, for example single or double sided grilling. Accordingly, there is a need for a cooking appliance that allows for expanded use.

SUMMARY OF THE INVENTION

It is an object of the present invention to provide a cooking appliance having a food mounting assembly.

It is another object of the present invention to provide a cooking appliance having a food mounting assembly that allows the cooking appliance to perform barbequing-type cooking functions.

These and other objects are achieved by the present invention.

According to an embodiment of the present invention, a cooking appliance includes a lower housing having a lower heating element, an upper housing having an upper heating element, opposed frame members disposed between the upper housing and the lower housing and operatively connecting the lower housing to the upper housing. The cooking appliance further includes a food mounting assembly. The food mounting assembly includes a bracket extending between the opposed frame members for retaining a means for supporting food items over the lower heating element.

According to another embodiment of the present invention a food mounting assembly for a cooking appliance having a lower housing including a lower heating element and an upper housing operatively connected to the lower housing is provided. The food mounting assembly includes a longitudinal mounting bracket operatively connected to the lower housing and at least one skewer extending generally perpendicularly from the mounting bracket and over the lower heating element.

According to yet another embodiment of the present invention, a method of configuring a cooking appliance to perform a barbeque-type cooking function is provided. The method includes the steps of operatively connecting a first housing with a second housing, arranging a heating element in the first housing, and equipping the cooking appliance with a food mounting assembly. The food mounting assembly includes a longitudinal mounting bracket operatively connected to the first housing and at least one skewer extending generally perpendicularly from the mounting bracket and over the heating element.

BRIEF DESCRIPTION OF THE DRAWINGS

The present invention will be better understood from reading the following description of non-limiting embodiments, with reference to the attached drawings, wherein below:

FIG. 4 is a side, cross-sectional view of the cooking appliance of FIG. 1, illustrating use of the food mounting assembly.

FIG. 5 is a perspective view of the food mounting assembly.

DETAILED DESCRIPTION OF THE PREFERRED EMBODIMENTS

Figure 1:
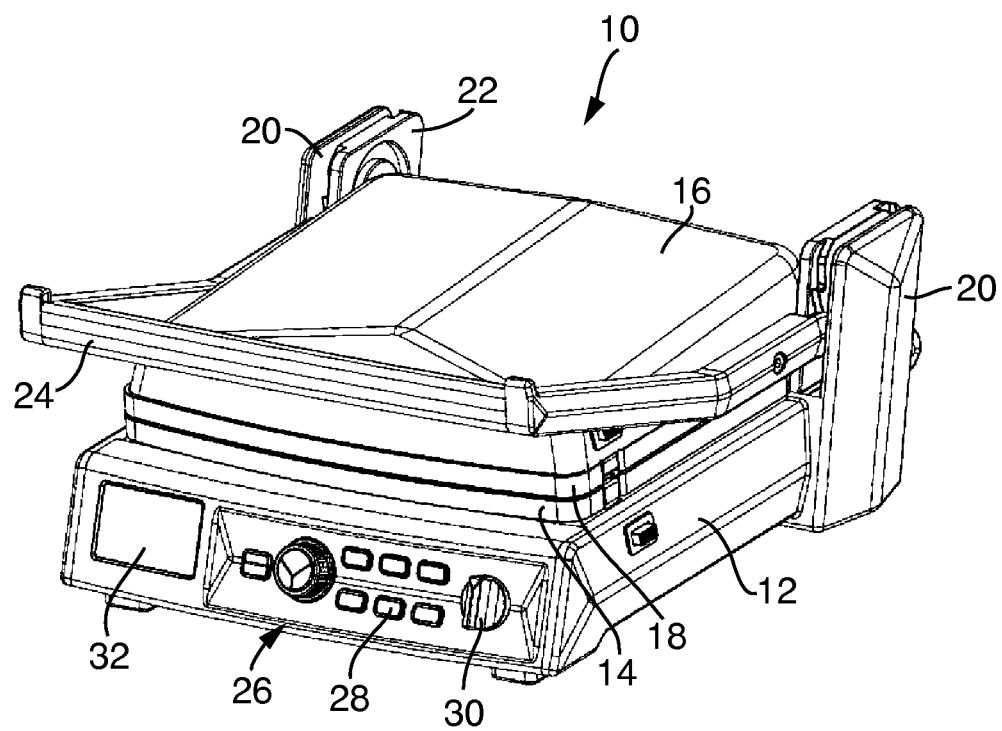
FIG. 1 is a perspective view of a cooking appliance according to an embodiment of the present invention, illustrating the cooking appliance in a closed position.
Figure 2:
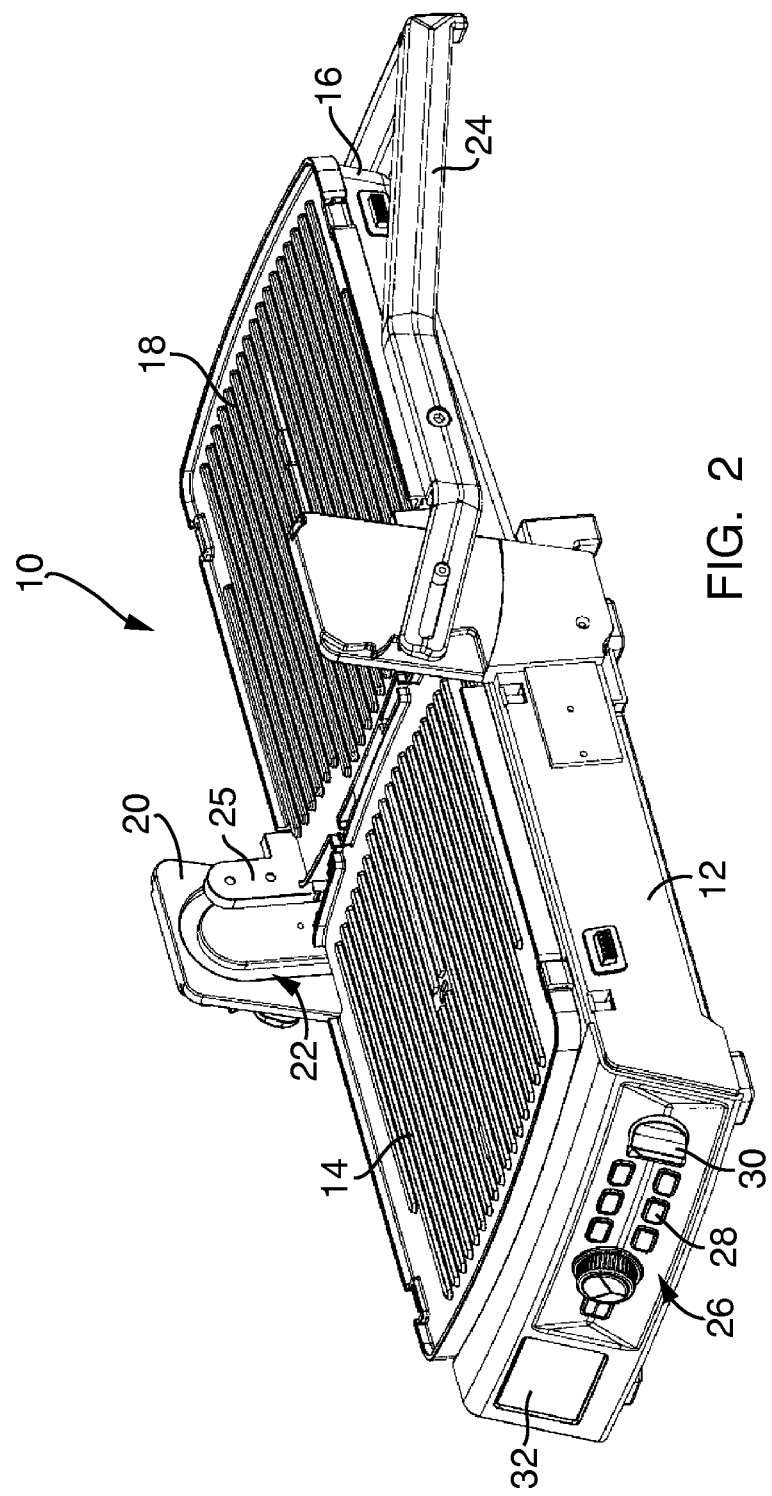
FIG. 2 is a perspective view of the cooking appliance of FIG. 1, illustrating the cooking appliance in a fully open position.

Referring to FIGS. 1 and 2, a cooking appliance 10 according to an embodiment of the present invention is shown. As shown therein, the cooking appliance 10 generally takes the form of a countertop grill and includes a lower housing 12 having a lower heating/cooking plate 14 and an upper housing 16 having an upper heating/cooking plate 18. Importantly, the upper and lower heating plates 14, 18 are removable from the upper and lower housing 12, 16, respectively, as discussed hereinafter.

The upper housing 16 is operatively connected to the lower housing 12 via opposed frame members 20 extending from the lower housing 16. In particular, as shown therein, the upper housing 16 rides in a guide track 22 in the frame members 20. A handle 24 attached to the upper housing 16 allows a user to raise and lower the upper housing 16 in the guide track 22 in order to selectively position the upper housing 16 in various positions in relation to the lower housing 12.

As best shown in FIG. 2, the guide track 22 is substantially 'n' shaped and the upper housing 16 is operatively connected to the frame members 20, via the guide track 22, through brackets 25 having wheels (not shown) that are received within the guide track 22. Importantly, the shape of the guide track 22 therefore controls the trajectory of movement of the upper housing 16 relative to the lower housing 12, allowing the upper housing 16 to be selectively positioned at various orientations relative to the lower housing 12. In particular, the upper housing 16 may be closed against the lower housing 12, as shown in FIG. 1, oriented in a fully open position, as shown in FIG. 2, or positioned and retained in intermediate, partially open positions (not shown).

With further reference to FIGS. 1 and 2, the cooking appliance 10 includes a control panel 26 having an array of buttons 28 and rotatable knobs 30 that allow a user to select and set a variety of cooking and heating parameters, and an LCD screen 32 that allows a user to view the parameters being set, as well as to monitor the cooking process.

Figure 3:
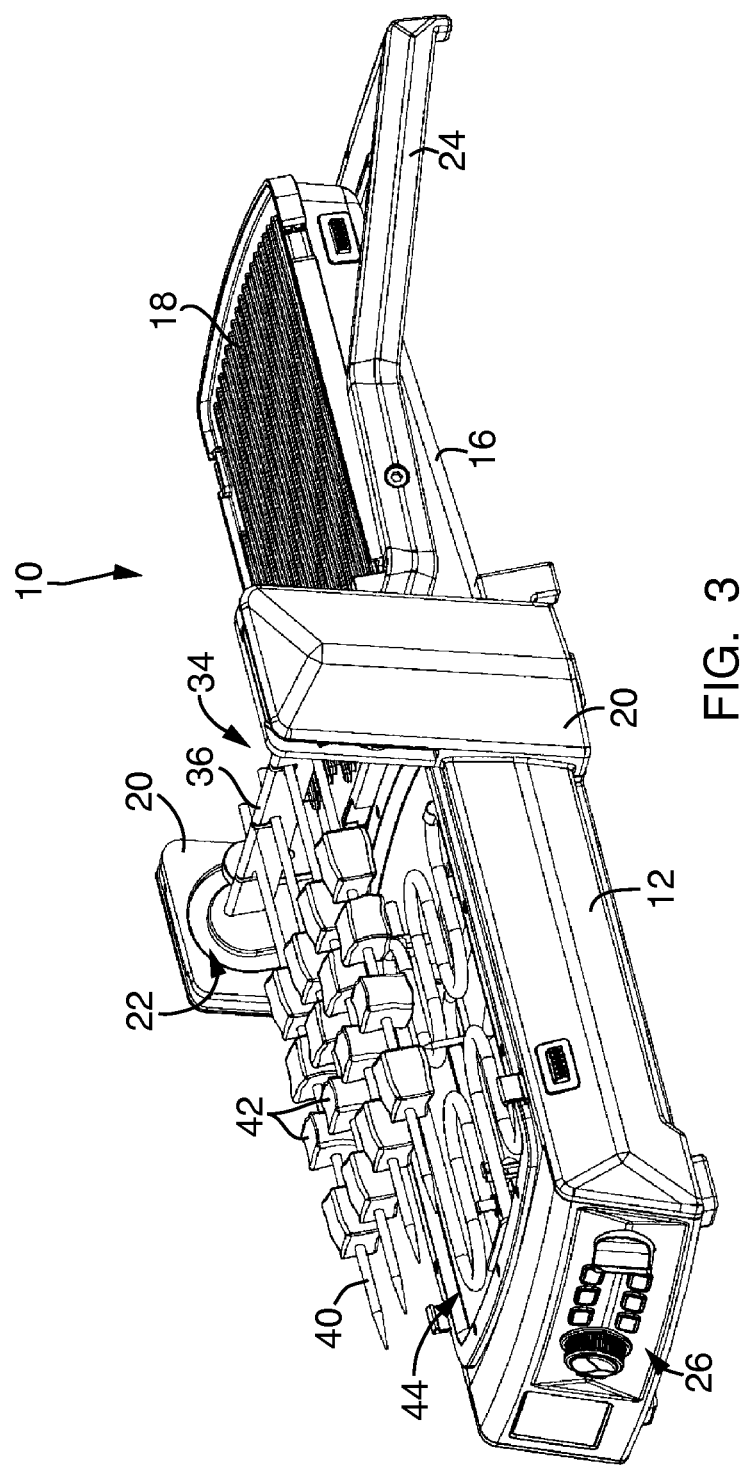
FIG. 3 is a perspective view of the cooking appliance of FIG. 1, illustrating use with a food mounting assembly according to an embodiment of the present invention.

Turning now to FIGS. 3 and 4, the cooking appliance 10 also includes a removable food mounting assembly 34 that is selectively positionable between the opposed frame members 20 on the lower housing 12. As shown therein, the food mounting assembly 34 includes an angled mounting bracket 36 that is generally 'V' shaped in cross-section. The mounting bracket 36 may be received in slots (not shown) formed in the frame members 20 or may engage protrusions (not shown) extending inwards from the frame members 20 in the area of the guide track 22.

As best shown in FIG. 5, the mounting bracket 36 includes a plurality of retaining slots 38 formed along its length that are configured to receive and retain skewers 40. The slots are generally "L" shaped and include a lower portion that is configured to support the skewers 40 in cantilevered fashion over the lower heating element of the lower housing 12, as discussed in detail below. In other embodiments, the slots 38 may be apertures sized and shaped to receive the skewers 40. As shown therein, the skewers 40 extend substantially perpendicularly from the bracket 36. With further reference to FIGS. 3-5, the skewers have pointed distal ends adapted to pierce food items 42, such as vegetables, beef, chicken, fish and the like.

As alluded to above, the lower heating plate 14 is removable from the lower housing 12 such that the food mounting assembly 34 (the bracket 36 in particular) may be installed on the lower housing 12 between the opposed frame members 20. Importantly, removal of the lower heating plate 14 also exposes the lower heating element 44, as shown in FIG. 3. The heating element 44 may be an electrical resistance heating element, although other types of heating elements known in the art may also be utilized without departing from the broader aspects of the present invention.

As further shown therein, skewers 40 containing food items 42 may then be inserted into the slots 38 in the mounting bracket 36 and supported in cantilevered fashion over the lower heating element 44. Alternatively, the skewers may be inserted into the slots 38 in the mounting bracket 36 prior to the mounting bracket 36 being installed on the lower housing 12.

In operation, once the skewers 40 containing food items 42 are inserted into the slots 38 in the mounting bracket, and the mounting bracket 36 is installed on the lower housing 12, a user may set the type of cooking to be carried out utilizing the control panel 26. As will be readily appreciated, it is therefore possible for the cooking appliance 10 to function not only as a single or double sided grill, Panini press or the like, but also as a barbeque grill performing 'barbeque' type cooking. In particular, radiant heat from the heating element 44 may be utilized to slowly cook food positioned over, but not in contact with, the heating element 44, as shown in FIGS. 3 and 4. As show therein, in this 'barbeque' position, the upper housing 16 is in its fully open position.

In the preferred embodiment, the bracket 36 and skewers 40 of the food mounting assembly 34 are formed from metal. Alternatively, the skewers 40 may be formed from wood or other material known in the art.

Figure 6:
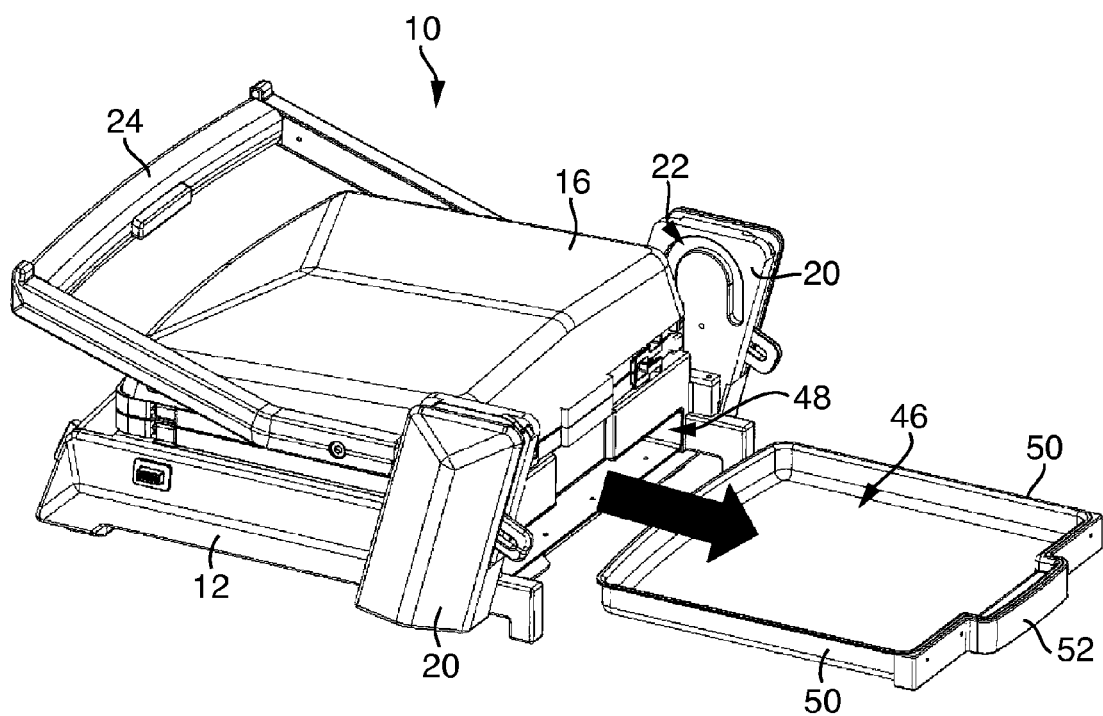
FIG. 6 is a rear perspective view of the cooking appliance of FIG. 1.

Turning now to FIG. 6, the cooking appliance 10 also includes a collecting tray 46 that is slidably received in an opening 48 in the lower housing 12. The collecting tray 36 is generally rectangular in shape and has upstanding sidewalls 50. The collecting tray 50 also includes a handle 52 for allowing a user to insert and remove the collecting tray 36 from the cooking appliance 10. When received by the lower housing 12, the collecting tray 46 is positioned beneath the heating element 44 to collect oil, drippings and other fluids from the food items 42 being cooked. As shown in FIG. 6, the collecting tray 46 may be removed from the cooking appliance 10 to allow for emptying and cleaning.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cooking appliance, comprising:
   a lower housing having a lower heating element;
   an upper housing having an upper heating element;
   opposed frame members disposed between said upper housing and said lower housing and operatively connecting said lower housing to said upper housing, said upper housing being movable in relation to said lower housing; and
   a food mounting assembly, said food mounting assembly including a bracket extending between and fixed to said opposed frame members for retaining a means for supporting food items over said lower heating element.

2. The cooking appliance of claim 1, wherein:
   said means for supporting food items is at least one skewer; and
   wherein said bracket includes a plurality of slots for retaining said at least one skewer in cantilevered fashion over said lower heating element.

3. The cooking appliance of claim 2, wherein:
   said plurality of slots are 'L' shaped.

4. The cooking appliance of claim 1, wherein:
   said bracket is generally 'V' shaped.

5. The cooking appliance of claim 1, wherein:
   said lower housing includes a removable lower heating plate.

6. The cooking appliance of claim 1, further comprising:
   a collecting tray slidably received in said lower housing and positionable beneath said lower heating element.

7. The cooking appliance of claim 1, wherein:
   said heating element is an electrical resistance heating element.

8. The cooking appliance of claim 1, wherein:
   said opposed frame members include a substantially 'n' shaped guide track formed on inward facing surfaces thereof; and
   wherein said upper housing is received in said guide track and movable relative to said lower housing along said guide track.

9. A food mounting assembly for a cooking appliance having a lower housing including a lower heating element and an upper housing operatively connected to said lower housing, said food mounting assembly comprising:
   a longitudinal mounting bracket operatively connected to said lower housing;
   wherein said lower housing includes opposed frame members;
   wherein said longitudinal mounting bracket extends between and is fixed to said opposed frame members; and
   at least one skewer extending generally perpendicularly from said mounting bracket and over said lower heating element.

10. The food mounting assembly of claim 9, wherein:
said bracket includes a plurality of slots for retaining said at least one skewer in substantially cantilevered arrangement over said lower heating element.

11. The food mounting assembly of claim 10, wherein:
said plurality of slots are 'L' shaped.

12. The food mounting assembly of claim 9, wherein:
said bracket is generally 'V' shaped.

13. The food mounting assembly of claim 9, wherein:
said lower housing includes a removable lower heating plate.

14. The food mounting assembly of claim 9, wherein:
said cooking appliance includes a collecting tray slidably received in said lower housing and positionable beneath said lower heating element.

15. The food mounting assembly of claim 9, wherein:
said heating element is an electrical resistance heating element.

16. The food mounting assembly of claim 9, wherein:
said upper housing is operatively connected to said lower housing via said opposed frame members.

17. The food mounting assembly of claim 16, wherein:
said opposed frame members include a substantially 'n' shaped guide track formed on inward facing surfaces thereof; and
wherein said upper housing is received in said guide track and movable relative to said lower housing along said guide track.

18. A method of arranging a cooking appliance to perform a barbeque-type cooking function, said method comprising the steps of:
operatively connecting a first housing with a second housing;
arranging a heating element in said first housing; and
equipping said cooking appliance with a food mounting assembly, said food mounting assembly including a longitudinal mounting bracket extending between and fixed to opposed frame members disposed between said first housing and said second housing and operatively connecting said first housing and said second housing, and at least one skewer extending generally perpendicularly from said mounting bracket and over said heating element for supporting food items over said heating element.

19. The method according to claim 18, further comprising the step of:
forming slots in said mounting bracket for receiving and supporting said at least one skewer in cantilevered fashion over said heating element.

* * * * *